Patented Sept. 12, 1939

2,172,781

UNITED STATES PATENT OFFICE 2,172,781

CHEESE COATING

Ronald Wood, Chicago, Ill.

No Drawing. Application May 13, 1937,
Serial No. 142,379

3 Claims. (Cl. 99—178)

The present invention relates to the preservation of cheese and more particularly to the prevention of mold growth thereon and therein.

In the handling, storing, curing and marketing of cheese, molds of various types usually develop on the outside of the rind of the cheese or on the coating in case the cheese is coated with a coating such as paraffin. Certain types of cheese are cured or ripened by mold growth. An example of such a cheese is Roquefort. However, in the case of most cheese, such as the American Swiss and brick cheese, the mold is a serious detriment. The mold formation on the exterior of the cheese impairs its sales appearance and causes it to be discriminated against by buyers. The molds gradually work their way entirely through the body of the cheese. The molds that inhabit cheese factories and storing and curing rooms are such as to make the cheese unsatisfactory for human consumption and they cause very heavy losses to the cheese industry as a whole.

It is the purpose of the present invention to provide a novel method of protecting those cheese which are not ripened by mold development as an inherent part of their manufacture. The present invention contemplates making a change in the nature of the cheese surface or rind and the provision of a coating which discourages attack of the cheese by the various types of molds.

The fat in cheese tends to sweat out to the surface and through the coating, usually paraffin, and this surface fat encourages mold growth because it is a substance which is readily attacked by the mold. The loss of fat impairs the quality of the cheese since it leaves it dry and crumbly. Coatings such as paraffin do not prevent the fat from sweating out, furthermore the moisture in the cheese as it is now prepared gradually finds its way out of the cheese resulting in a shrinkage in storage which may amount to from 2% to 8% in weight. This shrinkage due to loss in moisture, leaves the body of the cheese dry and tough and undeveloped because moisture is needed for proper bacterial growth and enzymatic action to produce proper body and texture in the cheese.

The present invention contemplates a method of treating the cheese by which the damage done by sweating out of the fats and loss of moisture are eliminated to a greater degree than has heretofore been possible.

In order that the present invention may be more fully understood, I will describe in detail one method by which the cheese may be treated to accomplish the purpose of the invention hereinbefore set forth.

I use any suitable means for handling the cheese. First I prepare a saturated or partially saturated solution of an alkali such as calcium hydroxide, sodium borate, trisodium phosphate, lime, sodium carbonate, etc. To this solution I also preferably add finely ground milk or vegetable casein. The solution may be used in various temperatures, but I prefer to heat it to a temperature of 190 degrees F. The solution is kept in a vat such as the ordinary cheese paraffining vat now used for applying a paraffin coating to the cheese. The cheese, after the rind has formed, is immersed in the hot alkali solution and kept therein until a soft gumminess may be detected on the rind of the cheese. The cheese is then raised out of the solution and allowed to dry. The ordinary dipping and drying racks may be used in immersing the cheese and removing it from the solution. The drying may be hastened by the use of mechanical or heating means if desired.

The heat and alkali solution act to destroy any mold or mold spores that may have been present on the surface of the cheese before immersion. Also the solution converts the casein of the outer portion of the cheese rind to an alkali caseinate. Therefore this new coating really becomes an integral part of the cheese itself having been formed by conversion of the outer film of the rind. The solution also saponifies the fats upon the surface of the cheese and renders the outside of the cheese alkaline in reaction, which prevents the molds from starting growth on surface fats. The outside of the cheese should have a pH value in excess of 7.0.

The film of alkali caseinate is sufficient protection for the cheese against mold growth and outside contamination of any sort during the subsequent handling, storing, aging and marketing. The further protection of a coat of paraffin can also be used after the film has dried. The film formed on the cheese is tough and rubbery and not crystalline like paraffin. The film does not crack or chip off so as to leave breaks in the cheese surface that would permit mold growth to start. The film is fat proof and does not allow the fat of the cheese to sweat out through it, thus preventing loss in fat and weight if the cheese becomes warm. The film is also water resistant to such a degree that it eliminates a major portion of the weight shrinkage which occurs in storage. Since the moisture and fats are retained within the cheese, it ripens more readily and evenly. The film is of such a tough rubbery nature that it is also particularly useful in retarding the attacks of cheese mites which are also bitter enemies to the cheese industry.

Most molds that attack cheese require an acid medium for growth and development and also the presence of some air. The cheese in its ordinary state is, therefore a perfect host for mold growth. When the fats in the cheese also sweat out to the surface, the attack of the mold is even more pronounced. Since the present method of treatment renders the surface of the cheese alkaline and moisture resistant and saponifies the fat present on the surface of the cheese, the growth of mold on the surface will be prevented indefinitely.

Another method of giving the outside film of the rind an alkaline reaction is to prepare an alkaline caseinate by adding casein to water in the presence of an alkali and heat. The resulting solution is coated on the cheese rind in any suitable manner, such as by brushing, spraying, etc. and drying the coating. In all cases, however, it is the aim to saponify the surface fats on the cheese and preferably to convert some of the casein of the cheese rind into an alkaline caseinate. The coating or surface of the cheese should have an alkaline reaction.

From the foregoing description it is believed that the method of the present invention will be readily understood by those skilled in this art.

Having thus described the invention what I claim as new and desire to secure by Letters Patent is:

1. The method of coating a cheese to prevent mold growth and loss of moisture and fat which comprises softening the outer surface of the cheese by immersing it in an alkaline solution having a temperature of about 190° F. until a portion of the cheese surface has been converted to an alkali caseinate coating of such thickness that it is capable, when dry, of preventing fat sweating out through it, and drying the surface to harden the coating.

2. A method of coating cheese to prevent mold growth and to avoid loss of fat and moisture from the cheese, said method comprising, dipping the cheese in a hot alkaline solution, thereby saponifying any surface fats present and encasing the cheese in a fat proof, water resistant gummy coating which is integral with the cheese itself, and thereafter drying the coating to a tough rubbery condition.

3. A method of coating an already prepared cheese, said method comprising coating the surface of the cheese with an alkali caseinate solution containing an excess of alkali, saponifying the surface fats on the cheese and converting a portion of the casein of the cheese surface to an alkali caseinate by means of the alkali present in the solution whereby to provide a fat proof, water resistant, mold preventing coating on the cheese.

RONALD WOOD.